United States Patent [19]
Tan

[11] Patent Number: 4,542,608
[45] Date of Patent: Sep. 24, 1985

[54] MUSHROOM CULTIVATION
[75] Inventor: Kok K. Tan, Singapore, Singapore
[73] Assignee: Everbloom Mushrooms, Singapore
[21] Appl. No.: 536,260
[22] Filed: Sep. 27, 1983
[30] Foreign Application Priority Data
Sep. 28, 1982 [GB] United Kingdom ............... 8227624
[51] Int. Cl.$^4$ ............................................. A01G 1/04
[52] U.S. Cl. ..................................................... 47/1.1
[58] Field of Search .......................................... 47/1.1
[56] References Cited
U.S. PATENT DOCUMENTS

| | | | |
|---|---|---|---|
| 1,869,517 | 8/1932 | Sinden | 47/1.1 |
| 2,044,861 | 6/1936 | Sinden | 47/1.1 |
| 2,520,318 | 8/1950 | Lescarboura | 47/1.1 |
| 3,177,615 | 4/1965 | Rowe | 47/1.1 |
| 3,828,470 | 8/1974 | Stoller | 47/1.1 |

Primary Examiner—Robert E. Bagwill
Attorney, Agent, or Firm—Price, Heneveld, Huizenga & Cooper

[57] ABSTRACT

A process for the manufacture of mushroom spawn comprises swelling cereal grains in water, sterilizing the swollen grain, e.g. in admixture with calcium carbonate, inoculating the sterile grain with a culture, e.g. in the form of a homogenate, and incubating the inoculated grains. The use of, say, $CaCO_3$ prevents grain aggregation.

4 Claims, No Drawings

MUSHROOM CULTIVATION

The use of grain for the manufacture of mushroom spawn is described in U.S. Pat. No. 1,869,517. In the given procedure, dry grain is placed in a bottle with a certain amount of water and calcium carbonate. The bottle containing the grain, water and calcium carbonate is then closed with a cotton plug and sterilised for 35 to 45 minutes at 121° C. After cooling, the bottle is inoculated, reclosed and incubated for the necessary period.

This known procedure has many disadvantages. Firstly, the grain at or near the bottom of the bottle often becomes a soggy mass after sterilisation. The grains are thus not free and, if inoculated, give spawn which is difficult to remove from the bottle. Secondly, it now appears that the given sterilisation time is insufficiently long; consequently, a large percentage of prepared spawn is found to be contaminated and thus unusable. Longer sterilisation does not help as this only produces more soggy grains. Thirdly, it is found that a large proportion of the added calcium carbonate finds its way to the bottom of the bottle, resulting in grains which are not uniformly "coated" with $CaCO_3$.

According to the present invention, a process for the manufacture of mushroom spawn comprises swelling cereal grains in water and sterilising the swollen grains under conditions which substantially prevent grain aggregation, inoculating the sterile grains with a culture, and incubating the inoculated grains. This process is very satisfactory; for example, it allows thorough sterilisation, without the disadvantages described above.

Any suitable cereal grains may be used. Examples of suitable cereals are wheat, barley and millet.

Preferably, the grains are first washed several times in water to remove, for example, dirt and chaff. This can reduce spawn contamination. The grains may then be soaked, by complete submersion, in water, e.g. for up to 24 hours. Longer soaking may result in soggy grains. The temperature should be such as to minimise fermentation (which can spoil the grains). The temperature is suitably at least 0, preferably at least 2, and not more than 10, preferably not more than 4, °C. The excess water is then drained off.

The swollen grains may be filled into flexible polypropylene (PP) bags or bottles. Calcium carbonate is usually added then or before filling, and thoroughly mixed with the grains. The bag or bottle is then stoppered, e.g. with a cotton plug or heat-resistant foam plug. When using PP bags, a PP collar may be used to form a neck into which a plug can be inserted.

Calcium carbonate apparently functions as a "coating" for the swollen grains. These are otherwise quite sticky, and liable to aggregate to the extent that the subsequent sterilisation step might not be uniformly effective. Other means might be used to achieve the same effect. Up to 5, e.g. about 2, % by weight $CaCO_3$ may be used, the percentage being based on the dry weight of the grains.

The grains are then sterilised, e.g. for 2 hours. The pressure during sterilisation may be up to 2, e.g. about 1, $kg/cm^2$. The temperature may be up to 140, e.g. 121, °C. An autoclave may be used. In order to reduce contamination further, the grains may be sterilised once, or preferably twice, more at intervals. The interval or intervals (e.g. of 24 hours) allow the germination of spores which are difficult to kill. On germination, the germs will be destroyed by further heat sterilisation, each further sterilisation period being, for example 1–2 hours.

When the grains are cool, they can be inoculated. For example, a culture homogenate is prepared by blending agar cultures with sterile water in a sterilised Waring blender, e.g. one culture per 100 ml water. The homogenate is then poured aseptically into an automatic dispenser, e.g. an Oxford pipettor, which has been sterilised. Aliquots of the homogenate are then dispensed into each bottle containing grains (10 ml homogenate per 100 g dry grains). This procedure of inoculation is rapid. Hundreds of bottles of grains can be inoculated within a short time.

The inoculated grains are then inculated, e.g. at 20°–25° C. After a period of inculation, e.g. 2–3 weeks, depending on the mushroom species, the spawn is ready for use. The grains may be shaken once or twice during incubation, to ensure uniform distribution. The spawn can be easily freed by tapping the bottle or, when flexible PP bags are used, by gentle crushing.

The following Example illustrates the invention.

EXAMPLE 50 kg wheat grains are washed with water in a revolving tilting tub. Enough water (at least 2 x the volume) is added to ensure that the dirt, chaff etc. can float and can be removed by tilting the tub and draining the water off. 3 washings are used. The wheat grains are then transferred to large tubs and water is added to submerge the grains completely. The tubs containing the grains are then placed in a cold room at 2°–4° C. for 20–24 hours, by which time the grains have imbibed sufficient water to give a hydration of 40–45%. The tubs are then moved out of the cold room and excess water is drained off. The swollen grains are then placed in an auger mixer. 1 kg $CaCO_3$, i.e. 2% by weight of $CaCO_3$ (dry weight basis), is then added. The grains are then mixed with the $CaCO_3$ for 2–5 minutes to ensure homogeneous mixing, and then filled into polypropylene bottles using an automatic filling machine which dispenses about 500 g per bottle. A cotton plug is used to stopper the bottle and the grains are sterilised at 1 $kg/cm^2$ at 121° C. for 2 hours. 2 further sterilisation periods of 2 hours are carried out at 24 hours intervals. The sterile grains are cooled and each bottle of sterile grains is inoculated with 10 ml of culture homogenate *Lentinus Edodes*, prepared as described above.

The bottles are shaken to mix the grains and culture homogenate thoroughly, before placing them in an incubation room at 25° C. After one week, the grains are shaken again. By this time the mushroom mycelia have grown and should be visibly white. Shaking re-distributes the inoculum points to ensure complete "coating" of grains with mushroom mycelia. After a further week of incubation, the grains appear white, i.e. the grains are completely overgrown with mycelia. Mushroom spawn is thus produced.

What is claimed is:

1. A process for the manufacture of mushroom spawn, which comprises the steps of:
    (1) soaking cereal grains in water at 0–10 degrees C. (32–50 degrees F.) for a time sufficient to obtain swollen grains;
    (2) draining off any excess water;
    (3) heat-sterilizing said swollen grains in a first heat-sterilization stage, under conditions such that said grains are substantially prevented from aggregation;

(4) after an interval, in which spores not killed in the previous heat-sterilization stage are allowed to germinate, heat-sterilizing said swollen grains in a further heat-sterilization stage, again under conditions such that said grains are substantially prevented from aggregation;

(5) if desired, repeating step (4);

(6) inoculating the thus-heat-sterilized grains with a mushroom cell culture; and (7) incubating the thus-inoculated grains, thereby obtaining muchroom spawn.

2. The process according to claim 1, wherein, in step (1), the cereal grains are soaked at 2-4 degrees C. (35.6-39.2 degrees F.).

3. The process according to claim 1 wherein the interval between heat sterilization stages is long enough and at a temperature at which germination of viable spores will occur.

4. The process according to claim 3 in which the interval is approximately 24 hours.

* * * * *